E. FUNK.
BORING AND BOLT INSERTING MACHINE FOR TIRES AND FELLIES.
APPLICATION FILED JULY 11, 1908.

956,071.

Patented Apr. 26, 1910.
4 SHEETS—SHEET 2.

Fig. 2.

Witnesses.
R. B. Gerby.
N. Smith.

Inventor.
Edward Funk
per
Wm. Hubbell Fisher,
Attorney.

E. FUNK.
BORING AND BOLT INSERTING MACHINE FOR TIRES AND FELLIES.
APPLICATION FILED JULY 11, 1908.

956,071.

Patented Apr. 26, 1910.

Witnesses.
R. B. Gerley.
H. Smith.

Inventor.
Edward Funk
per Wm. Hubbell Fisher,
Attorney.

UNITED STATES PATENT OFFICE.

EDWARD FUNK, OF CINCINNATI, OHIO, ASSIGNOR TO AMERICAN TIRE DRILL COMPANY, OF CINCINNATI, OHIO, A COPARTNERSHIP.

BORING AND BOLT-INSERTING MACHINE FOR TIRES AND FELLIES.

956,071.      Specification of Letters Patent.      Patented Apr. 26, 1910.

Application filed July 11, 1908. Serial No. 443,153.

*To all whom it may concern:*

Be it known that I, EDWARD FUNK, a citizen of the United States, and a resident of the city of Cincinnati, in the county of Hamilton and State of Ohio, have invented certain new and useful Improvements in Boring and Bolt-Inserting Machines for Tires and Fellies, of which the following is a specification.

The several features of my invention and the various advantages resulting from their use conjointly or otherwise, will be apparent from the following description and claims.

In the accompanying drawings, making a part of this specification, and in which similar letters of reference indicate corresponding parts.

A indicates the table or horizontal frame whereby the mechanism which is the subject of this specification is supported. $A^2$, $A^2$, etc., represent suitable devices for supporting this table or frame. In the present instance, they are in the form of legs. $A^3$, $A^3$, etc., indicate braces connecting the frame to the legs and strengthening the entire structure.

B indicates a power shaft rotatable by any suitable power.

$B^2$ indicates a power pulley, fixed concentrically on the shaft B.

$B^3$ is a loose pulley, loosely rotatable on the shaft B.

$B^4$, $B^4$ respectively indicate collars on the shaft B, adjacent to journal bearings $B^5$, to prevent the shaft B from slipping longitudinally. These journal bearings $B^5$ are shown by dotted lines in Fig. 1, at the right, and in solid lines at the left in said figure.

On the shaft B is fixed a pulley $B^6$ which operates a belt $B^7$. The latter extends from this pulley $B^6$ to pulley C, and when the power shaft B is rotated, pulley C is also rotated. The pulley C is mounted on a shaft $C^2$. This latter rotates the drill chuck hereinafter mentioned. In the shaft $C^2$ is a groove $C^3$. Pulley C would rotate upon the shaft $C^2$ were it not for a feather or pin, not shown but understood, and which projects into the groove $C^3$ in the shaft $C^2$. By these means and by this arrangement, the shaft $C^2$ can slip back and forth through the pulley C, but must rotate with the pulley.

$C^4$ is a journal bearing which supports the shaft $C^2$ next to the drill chuck.

$C^5$ is a journal bearing of shaft $C^2$, to one side (in front) of pulley C. $C^6$ is a journal bearing of shaft $C^2$ at the other side (behind) the pulley C.

$C^7$, $C^7$, $C^7$ indicate supports from the frame which respectively uphold the journal bearings $C^4$, $C^5$, $C^6$.

W is a chuck. The preferred construction of such a chuck is of my invention and will be hereinafter described.

E indicates a standard secured at its upper end to the shaft $C^2$ by a journal bearing $E^2$. The shaft $C^2$ is rotatable within the standard E. The improved means for preventing the shaft $C^2$ from sliding through the pulley C consists of the collars $E^3$, $E^3$. These collars are fixed on the shaft respectively in front of this bearing and behind it. In the bottom of the standard E is a slit into which is received the vertical guide piece $E^6$ attached to the frame. A rod F is pivotally connected to the standard E at $E^7$, and at its other end pivotally connected at $F^3$ to a lever $F^2$. This lever $F^2$ is pivotally fulcrumed at $F^4$ to a part of the frame.

Figures 1, 21:
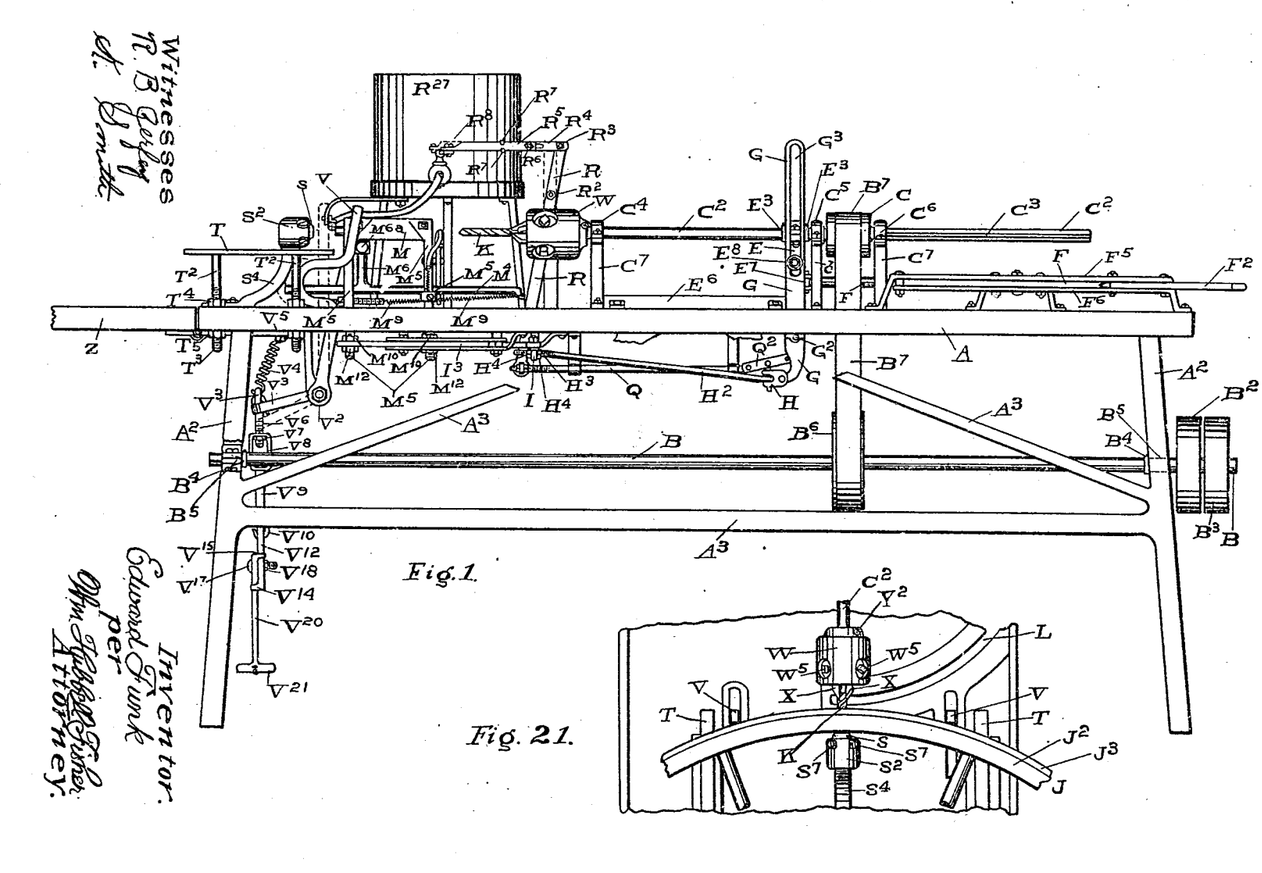
—Figure 1 is a side elevation of a machine embodying my invention.
Fig. 21 is a plan view of that part of the mechanism which is immediately included in the drilling of the wheel tire and showing a portion of the said wheel tire in position in the drill to bore a hole through the same, and to countersink the hole.

G, G are duplicate levers, respectively pivotally fulcrumed at $G^2$ to the frame. These levers are connected by arms $E^8$ respectively projecting laterally from the standard E. Each arm $E^8$ is received in a slot $G^3$ in the lever G, which latter it operates. Each lever G moves in its own guideway slot $G^4$, the latter preferably formed in the table of the frame. This slot is preferably bounded on each side with a guiding piece $G^5$. One of these levers,—the one nearest the spectator in Fig. 1, is pivotally connected to one end of a connecting rod $H^2$, whose other end is connected at $H^4$, to a bent lever comprising arms I, $I^2$ and $I^3$, pivoted at $I^4$ to the frame A. The free end of the arm $I^3$ of this lever is pivotally connected to the lower end of a vertical arm or support $M^5$, whose upper end is connected to one end part of a trough or guideway M, in the bottom of which latter runs the belt driver N. The arm $I^3$ is also connected to the lower end of a similar vertical arm or support $M^5$, whose upper end is connected to the other end part of the trough or guideway M. The vertical arms $M^5$, $M^5$ respectively slide through their respective guideways L, $L^2$. A guard $L^3$ is present to prevent any possible displacement in a downward direction of the arm $M^5$.

Below this trough is a horizontal bar $M^4$, slidable in guideways $M^{21}$ fixed to the arms $M^5$. From this bar $M^4$ extends upward a rod $M^6$, whose upper end part extends up through the bottom of the trough through the slot $M^7$ in the latter. The operator uses the handle $M^{6a}$ fixed to the rod $M^6$ and extending out at right angles thereto. By means of this handle, the rod $M^6$ and the bolt driver above and the rod $M^4$ below are moved, thus stretching the spring $M^9$ and latching the bolt driver N.

In the bottom of the trough M is the bolt driver or bolt driving device N aforesaid, slidable along the bottom of the trough M. The upright rod $M^6$ is connected to this bolt driver N, preferably as shown, namely: This rod $M^6$ extends up through an opening $N^2$ in the bolt driver, and a securing piece such as the cross pin $M^8$ or its equivalent, is secured to the top of this rod $M^6$ above the bolt driver N. The rod $M^6$ below the trough M is provided with a horizontal arm, which is a handle for moving this arm and for moving with it the horizontal arm $M^4$ and the bolt driver N. The bar $M^4$ keeps the rod $M^6$ in a proper vertical plane. A spring $M^9$ is strained between a point on the left end (forward) bar or support $M^5$ and the right hand end bar or support $M^4$. The tension of this spring $M^9$ will keep the bar $M^4$ retracted so that the vertical rod $M^6$ is at the left hand (forward end) of the trough M, except when this tension is overcome by human agency, and when the bolt driver N is locked in position at the right hand end of the trough M.

Means for latching the bolt driver at the right hand end of the trough in order to hold the same back in position for placing the bolt in front of it in the trough and for keeping it retracted until the proper instant occurs when it is to be unlatched is as follows: On the bolt driver is a small hook $M^{13}$. When the bolt driver is moved up to the edge of the rear end of the trough M, this hook $M^{13}$ catches over the end of the trough and holds the bolt driver there. On the rear end of the trough I locate a disengaging latch $M^{15}$, $M^{14}$, pivoted at $M^{16}$ to said support. The curved portion $M^{14}$ passes up directly under the hook $M^{13}$ of the bolt driver N. The latch when allowed to take its normal position will not act upon the hook $M^{13}$, because it is retracted out of such engagement by means of a spring $M^{18}$, secured at one end to the adjacent end of the part $M^{14}$ of said latch and its other end to an arm $M^{19}$ fixed to the said support $M^5$ by means of a set screw $M^{20}$. The other end $M^{15}$ of this latch operates as a trigger.

Figure 2:
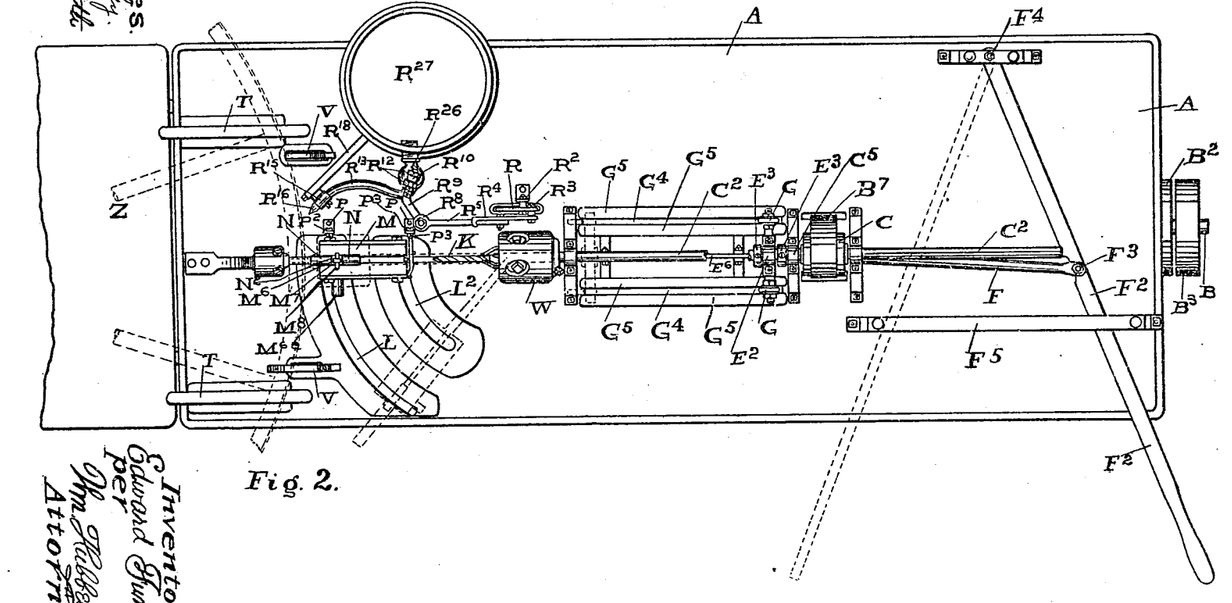
Fig. 2 is a top view of the machine shown in Fig. 1.
Figures 4, 5:
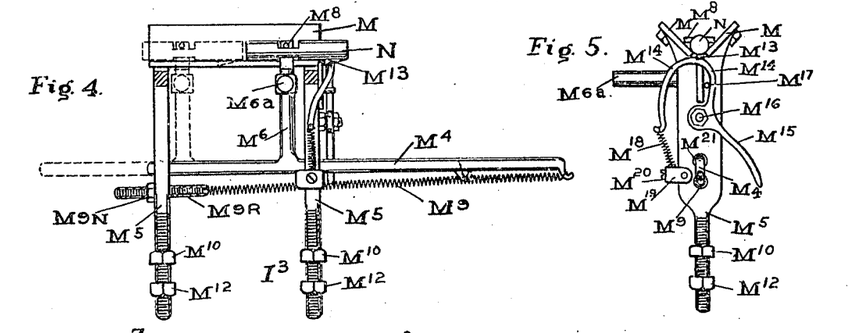
Fig. 4 is a side elevation of the mechanism for holding the bolt driver and for moving the latter.
Fig. 5 is an end view of the device shown in Fig. 4.
Figures 6, 7, 8, 9, 10, 11, 12, 13, 14:
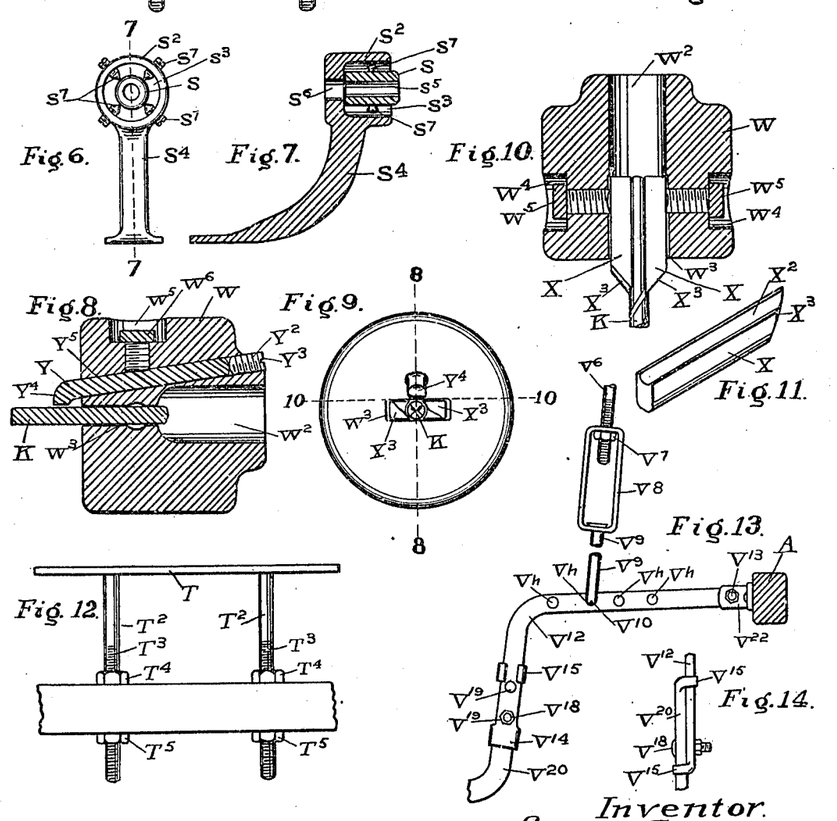
Fig. 6 is an end view of the mechanism which receives the drill after it has passed through the tire and felly.
Fig. 7 is a vertical central section of the device shown in Fig. 6, said section being taken in the plane of the dotted line 7, 7, of Fig. 6.
Fig. 8 is a vertical, central longitudinal section of the drill chuck taken in the plane of the dotted line 8, 8, of Fig. 9.
Fig. 9 is a front view of the drill chuck.
Fig. 10 represents a horizontal section through the chuck taken in the plane of the dotted line 10, 10 of Fig. 9, and looking upon that surface of the section which faces upward in Fig. 9.
Fig. 11 is a view in perspective of one of the stops employed in the drill chuck.
Fig. 12 is a side elevation of either one of the rests for supporting the wheel while holes are bored in its tire and felly for the reception of bolts.
Fig. 13 is a side elevation of mechanism for regulating the amount of pressure with which the frame of the wheel is held against the back stop shown in Fig. 6.
Fig. 14 is a detail, affording a side view of the lower portion of the frame shown in Fig. 13.
Figure 15:
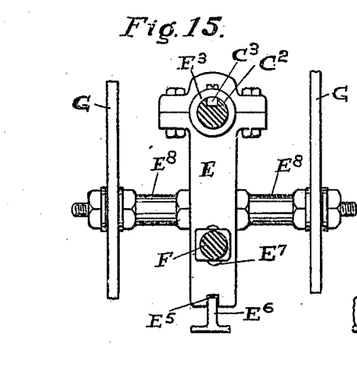
Fig. 15 shows a device which operates the levers, one of which levers operates the bolt carrier, and also regulates the supply of water to the drill. The central portion of this device reciprocates the shaft operating the drill chuck.

On the table-frame of the machine are located flanged lugs P, P. One of these lugs carries a set screw $P^2$, the other a set screw $P^3$. The set screw $P^3$ is advanced the proper distance so as the trough M is moved around and brought into alinement with the treadle $V^{21}$, as shown in Fig. 2, the latch part $M^{15}$ will come into contact with the set screw $P^3$ and its free end forced toward the support $M^5$. This causes the portion $M^{14}$ of the latch to rise and it, in turn, engages the hook $M^{13}$ of the bolt driver N and lifts the said hook up out of engagement with the lower edge of the trough. When this is accomplished, the bolt driver is free to move along through the trough M, and the spring $M^9$ acting upon the rod $M^4$, when moving it toward the left hand of the machine, see Figs. 2 and 4, causes through the medium of the upright rod $M^6$ the bolt driver to move rapidly toward the tire $J^3$ and felly $J^2$ and shoot a bolt located in the trough to the left of the bolt driver directly into the hole in the tire and felly which has been previously bored by the drill.

The supports for the rim of the wheel that is to be bored are as follows: That portion of the rim of the wheel which is nearest to the operative parts of the machine rests upon the flat bars T, T. These bars are capable of a vertical adjustment by means of the nuts $T^4$, $T^5$, one above and one below the adjacent frame or an equivalent part of the machine. These nuts work upon a screw thread $T^3$ on a leg $T^2$ of the bar T. Preferably the bar T is provided with two such bars or legs $T^2$. Each bar $T^2$ has its means of adjustment already described.

Means for holding the felly $J^2$ to the rim J of the wheel are substantially as follows: At each side of the machine and near its adjacent bar T on that side is a lever V. These levers are provided preferably with a serrated edge as shown in Fig. 2, in order to the better frictionally hold the felly against the back rest hereinafter described. Each lever V extends downward and is rigidly fixed at $V^2$ to a bar $V^a$ which extends across the central portion of the machine. This bar is rigidly connected to an arms $V^3$ which is hooked into one end of a spring $V^4$, the other end of the spring being connected at $V^5$ to an arm $V^{22}$ fixed to the frame. A rod $V^6$ extends down the arm $V^3$ and connects with the free end of a swivel $V^8$. Connection is made by the screw thread on the rod $V^6$ and the nut $V^7$ engaging said screw, thereby enabling the length of the rod at this point to be regulated as desired, and the throw of the lever V to be likewise regulated. From the lower end of the swivel extends the rod $V^9$, provided with a hook $V^{10}$ which engages the eye or hook on the part $V^{12}$. This rod $V^{12}$ engages the rod $V^{20}$ preferably as shown by means of the embracing hooks or fingers $V^{15}$, $V^{15}$, on part $V^{20}$, and hooks or fingers $V^{14}$ on part $V^{12}$. The parts will then slide one against another. They will be held back at a designated point by means of the nut and bolt $V^{18}$, through one of the holes $V^{19}$ in these parts. One hole $V^{19}$ is provided, in order that the length of this portion of the connecting rod may be diminished as desired. In the part $V^{12}$, there are holes $V^h$, $V^h$, and into these the hook $V^{10}$ is placed to engage the arm $V^{12}$, thus enabling an adjustment laterally and to a certain extent vertically to be made as desired, for the purpose of regulating the throw of the levers V relative to the back rest and the rim of the wheel. This arm or rod $V^{12}$ is duly pivoted at $V^{13}$ to an arm $V^{22}$ attached to the frame A. Below the rod or bar $V^{20}$ is a treadle $V^{21}$ rigidly attached thereto. In operating this portion of the device, the operator places the felly on the bars T, T, and in front of the back rest and then putting his foot upon the treadle $V^{21}$, causes the jaws to move toward the rim and presses the rim toward the back rest, thereby securely holding it in position. He then advances the drill to bore the requisite hole in the rim of the wheel.

A back rest of my invention is preferably as follows: S is a sleeve supplied with a hole $S^5$, slightly larger than the diameter of the bolt to be inserted through the rim. $S^2$ is a part having a cylindrical hole or recess $S^3$, and supported in any suitable manner, preferably by an arm $S^4$ bolted to the table-frame. The sleeve S is located centrally within this cylindrical recess $S^3$, and is held in position therein by means of set screws $S^7$, preferably four in number, which are screwed into and through this cylindrical part $S^3$ and bear against the sleeve S. By screwing these set screws in or out more or less, one is enabled to locate the sleeve S at the desired place within said recess, so as to cause the hole in the sleeve to be in perfect alinement, which in boring the rim of the wheel passes out of the hole into the said recess. As a further precaution for preventing the drill from being injured and from stopping it too soon, and for allowing the waste of iron and wood which the drill moves in boring the rim of the wheel to have a proper exit, a hole $S^6$ in the part $S^2$ is provided. This hole is preferably of a somewhat larger diameter than the hole $S^5$ in the sleeve S. The presence of this back stop or rest prevents the wood of the rim from being split away by the drill as the latter passes out of the wood toward the hub of the wheel.

It is to be observed that I have made the trough vertically adjustable preferably by means shown, viz: On each of the supports $M^5$, I form a screw thread and on this thread I locate two nuts marked respectively $M^{10}$ and $M^{12}$. One of these nuts $M^{10}$ is above and the other nut $M^{12}$ is beneath the reciprocatory bar or rod I, and they are screwed toward each other until the said bar I is clamped between them. By screwing both nuts the like distance up on the support $M^5$, the trough M is raised, and by screwing them down on the support the trough M is lowered. At the same time it is duly held fast to the bar I. The degree of tension of the spring $M^9$ is regulated by the screw threaded rod $M^9R$, to one of whose ends the adjacent end of the spring is connected. This rod $M^9R$ carries the nut $M^9N$ which bears against the front face of the left hand support $M^5$. By rotating this nut $M^9N$, the tension of the spring $M^9$ can be increased or diminished according as the rod $M^9R$ is moved forward or backward. the arcuate movement of the trough M relative to the back rest S, $S^2$, and to the stop studs $P^2$, $P^3$ is regulated preferably by the nuts $H^4$, $H^4$, on the threaded portion of the rod $H^2$, and which clamp between them the eye of the lever arm $I^2$. The movement of the lever R is also regulated by the nuts $Q^6$, $Q^7$, which engage the threaded end of the rod Q and clamp between them the stud $Q^8$ connected by the bolt $Q^9$ to the lower end of the lever R. The lower end of the lever G which is farthest from the spectator is pivotally connected at $Q^4$ to a link $Q^2$, in turn pivotally connected at $Q^3$ to the rod Q. The lever R is fulcrumed at $R^2$, and is pivotally connected at its upper end to a connecting rod $R^4$, $R^5$, whose other end is pivotally connected to the adjacent end of an arm $R^9$ whose other end is fixed to the valve $R^{26}$ which latter regulates the flow of water from the tank $R^{27}$. The arm $R^9$ is adjustably connected to the valve $R^{26}$ by means of the nuts $R^{12}$, $R^{12}$, screwed in this arm $R^9$ and gripping the top of this valve between them.

Figures 3, 17:
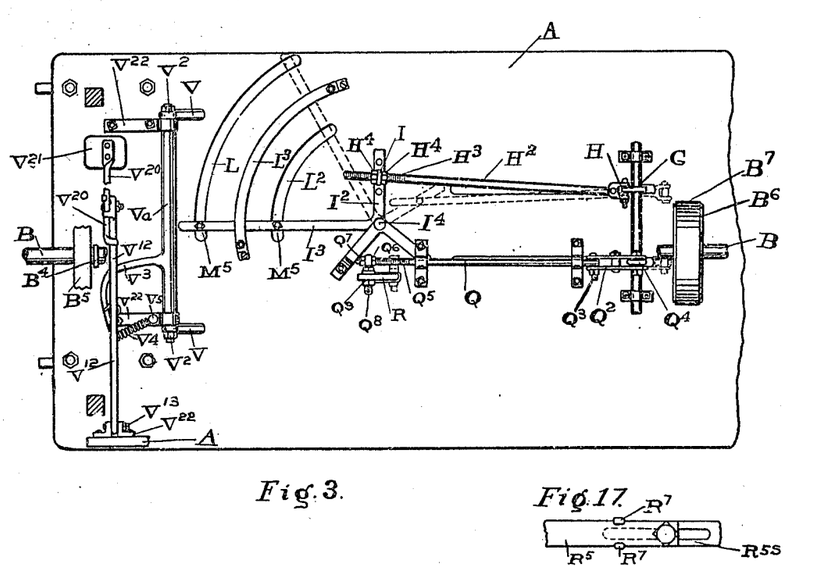
Fig. 3 is a view of the under side of the machine looking upward from the floor.
Fig. 17 is a side elevation of the device for adjusting the length of the throw of the arm which regulates the throw of the water.
Figures 16, 18, 19, 20:
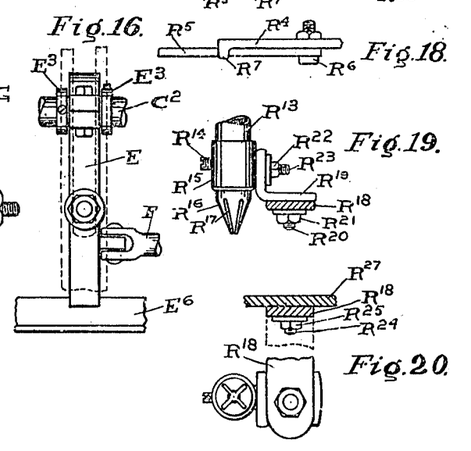
Fig. 16 is a side view of the device shown in Fig. 15, with the following qualification, that the part G shown in Fig. 15 is shown in dotted lines only.
Fig. 18 is a top view of the same.
Fig. 19 is a top view of the nozzle of the conduit which supplies water to the drill chuck.
Fig. 20 is a side view of the device shown in Fig. 19, including a portion of the support of the same which is connected to the tank above.

As already suggested, the bar or rod $R^4$, $R^5$, is preferably made compound, as shown in Figs. 3, 17 and 18, the bar $R^4$ overlapping the adjacent end portion of the bar $R^5$, and being provided with hooks $R^7$, $R^7$, which latter respectively overlap the respective edges of the bar $R^5$. There is a slot $R^5S$ in the bar $R^5$ and a bolt $R^6$ extends through this slot and through the bar $R^5$ and being screwed to place holds the bars $R^4$, $R^5$ firmly together. The length of this compound bar $R^4$, $R^5$ can be varied to the extent of the slot $R^5S$. This adjustment aids in locating the throw of the lever R for most advantageous work relative to the amount of desired opening given to the valve $R^{26}$, at each forward oscillation of the part of said lever R above the pivot $R^2$. From the valve $R^{26}$ there extends a hose $R^{13}$ which terminates in a nozzle $R^{15}$, $R^{16}$. The part $R^{15}$ receives the adjacent end of the hose and a set screw $R^{14}$ holds it in place within said part $R^{15}$. The nozzle portion $R^{16}$ has an aperture for the discharge of water. This aperture is preferably divided into a number of converging radial slots $R^{17}$ for the more effective and widespread discharge of the water in the desired manner upon the drill where it is boring into and through the tire and felly of the wheel rim. The lower end of the hose and this nozzle are held in the proper position relative to the drill by means of the arm $R^{18}$ pivotally fixed at one end of the frame of the tank $R^{27}$, and at the other to the nozzle, preferably by means of an arm $R^{19}$, one flange of which is bolted by a bolt $R^{20}$, and nut $R^{21}$ to the arm $R^{18}$, and the other flange of which is bolted by nut $R^{22}$, $R^{23}$ to the nozzle.

The arm $R^{18}$ is pivotally connected to the tank frame by a bolt $R^{24}$, $R^{25}$. This arrangement of arm $R^{18}$ in connection with the nozzle $R^{16}$ enables the operator to move the nozzle $R^{16}$ forward or from the drill when advanced to operate on the rim, and thus adjust the flow of water from the nozzle, so that it shall effectively flow upon the drill and counterbores while they are at work. I purpose using in connection with this drilling mechanism a drill chuck which shall combine the functions of holding the drill K of any proper make, and the counterboring device, of a new and desired construction and the stop to more particularly limit the entrance of the counterbore into the metal of the tire to a given distance. I will now describe this chuck. The chuck W has the usual cylindrical form. It has a rear central recess $W^2$ for convenience in reaching and in manipulating the drill and the counterbores. It has a flat recess $W^3$ located in the front portion of the chuck and connecting with the rear recess $W^2$. In this recess $W^3$ I locate the drill K and the counterbores. Each counterbore X is preferably as shown the duplicate of the other, and consists of a steel bar provided on one side with a groove $X^2$ adapted to receive the adjacent side of the drill and fit snugly thereto. The front end of the counterbore is of an inclined curve substantially as shown, thereby forming a cutting edge $X^3$, as shown. When in place in the chuck, the drill is between the counterbores and its respective adjacent sides are received into their respective grooves. Against each counterbore is screwed a set screw or set bolt $W^5$, the screw thread of said bolt engaging a female thread in the chuck. A recess $W^4$ is provided in the chuck in which the head of the bolt may be, and so not project beyond the periphery of the chuck and yet be reachable, so that it can be rotated. These bolts W⁵ are used to fix the combination of the drill and the counterbores tightly in place. They permit the counterbores to project more or less and to be set having the desired projection for counterboring the desired depth in the metal operated on.

In connection with the chuck I prefer to employ a stop Y⁴, located in a passageway Y⁵. The rear end of this passageway has a threaded set or heel stop Y², Y³, screwed therein, and the rear end of the stop Y⁴ bears against this stop. By screwing this heel stop Y² forward or backward the distance the stop Y⁴ projects from the forward part of the chuck is adjusted. A set screw W⁶ screwed through the chuck and against the stop Y⁴ operates to hold the latter firmly and to prevent it moving forward in the chuck. A recess W⁶ enables the head of the set screw W⁵ to be within the chuck and yet be capable of being rotated. The stop Y⁴ prevents the counterbores from counterboring beyond a desired distance into the tire, etc., and prevents the chuck from coming into contact with the metal in which the hole is being made by the drill.

The mode in which my invention is operated is in general as follows: The wheel whose rim is to be operated upon is placed on a suitable support as the table Z. That part of the rim of the wheel which is to be bored, etc., is rested on the rests T, T, and is laid directly against the back stop or rest S, and between the latter and the drill. The operator clamps the rim of the wheel firmly against the back stop S, by depressing the treadle V²¹, and thereby bringing the clamping levers V, V, respectively against the rim of the wheel in the vicinity of the respective rests T, T. The drill K is now advanced by moving the lever F² from the position shown in solid lines in Fig. 2 toward the position indicated for it in dotted lines. It is understood that power is used and the pulley C is rapidly rotating at the desired rate of speed and rotating the drill. The drill enters and bores through the metal of the tire and into the wood of the felly, and emerging from the felly at the rear or inside thereof presses the chips and dust caused by the boring into the passage S⁵ of the back stop and pushes them on. The passage S⁶ of the cylindrical piece S² receives the refuse as it comes out from passage S⁵. Meanwhile the counterbores X, X, are operating and counterbore the entrance of the hole made by the drill in the metal tire. When the counterboring has reached the depth desired, the stop Y, Y⁴, impinging against the metal of the tire, prevents the drill and counterbores from advancing farther. The operation of drilling is now finished, and the drill is withdrawn by moving back the lever F² to its original position. While these operations of drilling and counterboring have been going on, the drill and counterbores have been receiving water from the tank R²⁷ through the valve R²⁶ and hose R¹³ and nozzle R¹⁶. This water is thus admitted, because as the lever F² is moved to advance the drill the lever G in connection by intermediate parts already described, with the lever R and lever R⁴, R⁵, and arm R⁹, opens the valve R²⁶ and allows the water to pass from the nozzle R¹⁶ and be sprayed on to the drill and the counterbores.

As soon as the drilling and counterboring are completed, and the lever F² is retracted, the lever R is moved back and the valve R²⁶ is closed and the flow of water from the nozzle R¹⁶ is stopped. As the lever F² is thus retracted, the mechanism for placing a bolt in that hole of the wheel rim which is just bored, is operating as follows: the retraction of the lever F² namely: moving it from the left to the right, Fig. 2, causes the farther lever G, through the agency of the connecting rod H² and the angulated lever I², I³, see Fig. 3, and the supports M⁵, M⁵, to move the trough in an arcuate direction from the position shown in dotted lines to the position shown in solid lines, Fig. 2.

It is unnecessary to set the bolt driver N at the right hand end of the trough, and to lay a bolt in the left hand portion of the trough at some time before the bolt driver is used to deliver the bolt. This operation is preferably performed before the trough is moved into alinement with the hole in the wheel rim. The operator sets the driver N by pushing with the handle M⁶ᵃ until the latch M¹³ of the driver catches over the edge of the trough M. He then places a bolt in the trough to the left of the driver N. As the operator moves the lever F² from right to left, he retracts the drill to its first position, and moves the trough M into the position shown by solid lines in Fig. 2. As the trough M comes into this position, the latch M¹⁵ strikes the abutment P³. This unlocks the latch M¹³ of the driver N. Thereupon the spring M⁹ is free to act and moves the driver N rapidly toward the rim of the wheel. The driver N pushes the bolt in the trough into the hole in the rim. The bolt is now located in the rim, its head in the countersunk portion of the hole and the outer face of the head flush with or slightly below the outer surface of the tire. The bolt is ready to receive its securing nut at the inner side of the rim or to be riveted in place. As the lever F² is again advanced, the wheel is shifted into position to enable a new hole to be bored, the trough is moved out of alinement with the drill and into the position shown by dotted lines in Fig. 2, the driver N is reset and another bolt laid in the trough, and the mechanism is ready for a repetition of the operations aforedescribed.

What I claim as new, and of my invention and desire to secure by Letters Patent, is:—

1. In a machine for making holes in the rims of wheels, the reciprocatory rod F, reciprocatory part or standard E, pivotally connected with said rod, and carrying arm $E^8$, slotted lever G in contact with arm $E^8$, grooved shaft $C^3$, journal bearings for the shaft, pulley C on shaft $C^3$ and having its pin in said pulley groove, drill of said shaft, lever R pivotally fulcrumed to the frame, rod H connecting lever G to lever R, arm $R^4$, $R^5$, connected at one end to arm R, arm $R^9$, pivoted at one end to arm $R^4$, $R^5$, valve $R^{26}$ whose valve rod is fixed to rod $R^9$, hose from the valve, and nozzle at the end of the hose, and adjustable support for the nozzle, and tank for supplying water to the nozzle through said valve, substantially as and for the purposes specified.

2. In a machine for making holes in the rims of wheels, the reciprocatory rod F, reciprocatory standard or part E pivotally connected to said rod and carrying arm $E^8$, slotted lever G in contact with arm $E^8$, grooved shaft $C^3$, journal bearings for the shaft, pulley C slidable on shaft $C^3$, but rotatable therewith, lever R pivotally fulcrumed to the frame rod H connecting lever G to lever R and provided with adjustable means at such connection for regulating the length of said rod H, arm $R^4$, $R^5$, provided with bolt, for enabling the arm to be lengthened or shortened, arm $R^9$ pivoted at one end to arm $R^4$, $R^5$, valve $R^{26}$, connected to rod $R^9$, conduit from valve, and nozzle at the end of the conduit, through said valve, adjustable support for the nozzle, substantially as and for the purposes specified.

3. In a machine for making bolt holes in wheel rims, a slidable drill shaft, a reciprocatory rod F connected to a reciprocatory part or standard E, the latter connected to the slidable drill shaft $C^2$, means for rotating the drill shaft, part E provided with an arm $E^8$, a lever G in contact with arm $E^8$ and connected to rod $H^2$, lever $I^2$, $I^3$, pivotally fulcrumed at $I^4$, the connecting rod $H^2$, the arm $I^2$ connected to the said connecting rod $H^2$, the arm $I^3$ provided with fixed uprights moving in the arcuate slots L, $L^2$, a trough fixed to the said upright supports $M^5$, $M^5$, containing a bolt driving device N, provided with a latch $M^{13}$ for engaging a portion of the trough, a rod or bar $M^4$ located below the trough, a spring $M^9$ strained and connected at one end to the rod or bar $M^4$, a vertical rod $M^6$ and fixed at one end to the rod or bar $M^4$ and at its other end connected to the bolt driving device, and having handle $M^{6a}$ for operating it, a trigger $M^{14}$, $M^{15}$, pivoted at $M^{16}$, one of the upright supports $M^5$, and abutments $P^2$, $P^3$ on the frame adapted to receive the impact of the trough mechanism and limiting the movement of the same, the said abutments $P^3$ being adapted to engage the trigger $M^{15}$ and release the bolt driver N, spring $M^{18}$ connected to the end of this trigger latch for returning the latch to its first position after it has been moved by coming into contact with abutments $P^3$, substantially as and for the purposes specified.

4. In a machine for boring and countersinking fellies and tires, and inserting the bolt in said hole in said fellies and tires, the combination of the drill shaft, and the sliding carriage carrying this drill shaft, and means adapted to reciprocate this sliding carriage, the lever operated by said carriage, a trough for the reception of the bolt, mechanism adapted to enable said lever to move the said trough into alinement with the said drill shaft and to withdraw it therefrom, and a bolt driver, means for retracting the bolt driver, and a catch to hold the bolt driver until opposite the hole in the felly and tire, means for advancing the driver to throw the bolt, when the catch is unlocked, means adapted to unlock the said catch, substantially as and for the purposes specified.

5. In a machine for boring and countersinking fellies and tires, rests adapted to support the rim of the wheel, a stationary abutment against which that side of the felly can bear, which is opposite to the side at which the drill advances to bore the felly, a pair of levers respectively in planes at the respective sides of the drill, means adapted to reciprocate these levers, and in one direction of such reciprocation cause them to forcibly bear against that side of the felly which is opposite where the said stationary abutment is located, and hold the felly in position while being drilled.

6. In a machine for boring and countersinking fellies and tires, a rotatory slidable drill chuck or holder, rests provided with screw threaded supports, the latter extended through a portion of the frame of the machine, nuts engaging the said screw threads, a rear abutment opposite the said chuck, and reciprocatory means for holding the wheel rim against the said rear stationary abutment.

7. In a machine for boring and countersinking fellies and tires, a slidable rotatory drill chuck or holder, rests adapted to be set vertically higher or lower, a rear stationary abutment consisting of a sleeve S, axially in alinement with the axis of the drill chuck, an outer surrounding sleeve supported from the frame, and set screws screwed through the said outer sleeve and bearing against the said sleeve S, and conferring upon the latter the capacity of adjustment in several directions, and means for holding the wheel rim against said stationary abutment.

8. In a machine for making bolt holes in wheel rims, a slidable rotatable drill shaft, a lever G, means for operating this lever, arms $I^2$, $I^3$, a connecting rod $H^2$ pivotally connected at one end to the lever G and at the other end to the arms $I^2$, $I^3$, the latter constituting an angulated lever pivotally fulcrumed at $I^4$, a trough, a bolt driving device whose driver is located therein, mechanism adapting the trough to be brought in front of the drill chuck and in alinement therewith and for retracting it, said mechanism being in connection with said angulated lever, and adapted to be operated thereby, elastic means for advancing the bolt driver, devices adapted to automatically retract the bolt driver to set the same and unlatch it.

9. In a machine for making bolt holes in wheel rims, a slidable rotatable drill shaft, a lever G, connected to the said slidable shaft, the latter adapted to move with this lever G, means for operating this lever, arms $I^2$, $I^3$, a connecting rod $H^2$ pivotally connected at one end to the lever G and at the other end to the arms $I^2$, $I^3$, the latter constituting an angulated lever pivotally fulcrumed at $I^4$, a trough, a bolt driving device whose driver is located therein, mechanism adapting the trough to be brought in front of the drill chuck, and in alinement therewith and for retracting it, said mechanism being in connection with said angulated lever, and adapted to be operated thereby, elastic means for advancing the bolt driver, devices adapted to automatically retract the bolt driver to set the same and unlatch it.

10. In a machine for making bolt holes in wheel rims, a drill slidable in bearings, means for rotating the same, lever for reciprocating it, a slidable carriage or standard E connected to the drill shaft having arms $E^8$, $E^8$, levers G, G, in contact with their adjacent arms $E^8$, $E^8$, a valve regulating the water conduit for supplying water to the drill, means intermediate between one of these levers G and the valve of said water supply for opening the valve when the drill is advanced in operation, said means being connected to the said lever G and to the said valve, the trough M adapted to receive the bolt driver, reciprocatory therein, provided with a device for automatically moving it forward and delivering the bolt into the hole made by the drill, the mechanism between the trough and levers G, and connected thereto for enabling the movement of the said levers to reciprocate the trough, the combination being substantially as shown, for enabling the advance of the drill and the water supply to be operative when the bolt driving device is moved to one side, and the bolt driving device to be operated as the drill is retracted and the supply of water shut off, substantially as and for the purposes specified.

11. In a machine for making bolt holes in wheel rims, horizontal rests T, T, on which the rim may be rested while against the back stop, the back stop vertical and in a horizontal plane above the plane of the said rests, and vertical oscillatory levers V, V, and means for enabling the same to be moved forward against the rim of the wheel to press the same against the back stop while the bolt hole is being made in the rim and while the bolt is inserted in such hole, substantially as and for the purposes specified.

12. In a machine for making bolt holes in wheel rims, a back stop, rests, levers V, pivotally fulcrumed to the frame, screw threaded device $V^6$, $V^8$, united at one end to lever V, and united by nut $V^7$ to the swivel $V^8$, the latter connected at its lower end by hook $V^{10}$ to the bent lever $V^{12}$, the same provided with holes $V^h$, $V^h$, into one of which the part $V^{10}$ of the part $V^9$ may be inserted, this lever $V^{12}$ being provided with an additional portion $V^{20}$, and a treadle $V^{21}$ fixed to the upright $V^{20}$, the part $V^{20}$ clamped to the part $V^{12}$ by a bolt $V^{18}$ capable of being changed from one of the holes $V^{19}$ of the part $V^{12}$ into another hole $V^{19}$ for the purpose of adjusting the throw of the levers V, V, substantially as and for the purposes specified.

13. In a machine for boring holes, a back stop consisting of a sleeve S having a passageway $S^5$ through it and an outer cylindrical support $S^2$ having an opening $S^6$ directly in the rear of the passageway $S^5$ of the sleeve S, an annular space between the sleeve S, and the outer cylindrical support and set screws $S^7$ screwed into and through the shell of the hollow cylinder $S^2$ and bearing against the periphery of the sleeve S, thereby enabling the latter to be adjusted relatively to the device for boring the hole in the article to be bored and for enabling the bolt to be inserted in said hole in said article, substantially as and for the purposes specified.

EDWARD FUNK.

Attest:
 STARBUCK SMITH,
 K. SMITH.